(12) United States Patent
Gupta et al.

(10) Patent No.: US 9,668,171 B2
(45) Date of Patent: May 30, 2017

(54) MAXIMIZATION OF RADIO RESOURCE ALLOCATION FOR A CARRIER AGGREGATED USER EQUIPMENT

(71) Applicant: Aricent Technologies Luxembourg s.a.r.l., Luxembourg (LU)

(72) Inventors: Rajiv Gupta, Haryana (IN); Mayank Kumar Rastogi, Haryana (IN); Rajesh Jain, Haryana (IN); Gaurav Goel, Haryana (IN); Tauheed Ahmed, Haryana (IN)

(73) Assignee: Aricent Holdings Luxembourg S.A.R.L., Luxembourg (LU)

( * ) Notice: Subject to any disclaimer, the term of this patent is extended or adjusted under 35 U.S.C. 154(b) by 312 days.

(21) Appl. No.: 14/546,046

(22) Filed: Nov. 18, 2014

(65) Prior Publication Data

US 2016/0143046 A1 May 19, 2016

(51) Int. Cl.
*H04W 28/08* (2009.01)
*H04W 72/12* (2009.01)

(52) U.S. Cl.
CPC ........ *H04W 28/08* (2013.01); *H04W 72/1226* (2013.01); *H04W 72/1247* (2013.01)

(58) Field of Classification Search
CPC ............. H04W 28/08; H04W 72/1226; H04W 72/1247; H04W 28/085
See application file for complete search history.

(56) References Cited

U.S. PATENT DOCUMENTS

| | | | | |
|---|---|---|---|---|
| 2012/0057547 A1* | 3/2012 | Lohr | ..................... | H04L 5/0007 370/329 |
| 2013/0279446 A1* | 10/2013 | Lv | ........................... | H04L 5/001 370/329 |
| 2014/0241265 A1* | 8/2014 | Pragada | ................. | H04W 72/04 370/329 |
| 2015/0016350 A1* | 1/2015 | Moulsley | .......... | H04W 72/0453 370/329 |
| 2015/0271836 A1* | 9/2015 | Damnjanovic | ... | H04W 72/0413 370/329 |

(Continued)

OTHER PUBLICATIONS

Distributed & Prioritised Scheduling to Implement Carrier Aggregation in LTE Advanced Systems, Sharma et al, Feb. 2014, IEEE.*

(Continued)

*Primary Examiner* — Habte Mered
(74) *Attorney, Agent, or Firm* — Harrington & Smith

(57) ABSTRACT

To schedule user equipments (UEs) in a scheduling period, for each of X cells in a carrier aggregation (CA) system relative priorities of data bearers are determined. Each data bearer is associated with a respective UE having buffered data and at least one of the UEs is a CA-UE that is allowed radio resource allocation to its associated data bearers in at least two of the cells. For each CA-UE, the buffered data of the CA-UE is distributed across those cells in which the CA-UE and its associated bearers are allowed resource allocation using a measure of total data throughput for each of those cells. For each of the X cells resources are allocated to the data bearers according to the relative priorities such that for each CA-UE the resources allocated to its associated data bearers across those cells are sufficient to carry the buffered data as distributed.

10 Claims, 5 Drawing Sheets

(56) References Cited

U.S. PATENT DOCUMENTS

| | | | |
|---|---|---|---|
| 2015/0350955 A1* | 12/2015 | Somasundaram | H04W 28/20 370/329 |
| 2015/0351106 A1* | 12/2015 | Wijetunge | H04W 72/1226 370/329 |
| 2016/0119945 A1* | 4/2016 | Fang | H04W 72/1284 455/450 |
| 2016/0165628 A1* | 6/2016 | Huh | H04W 72/1268 370/336 |

OTHER PUBLICATIONS

Carrier Load Balancing and Packet Scheduling for Multi-Carrier Systems, Wang et al, 2010, IEEE.*

* cited by examiner

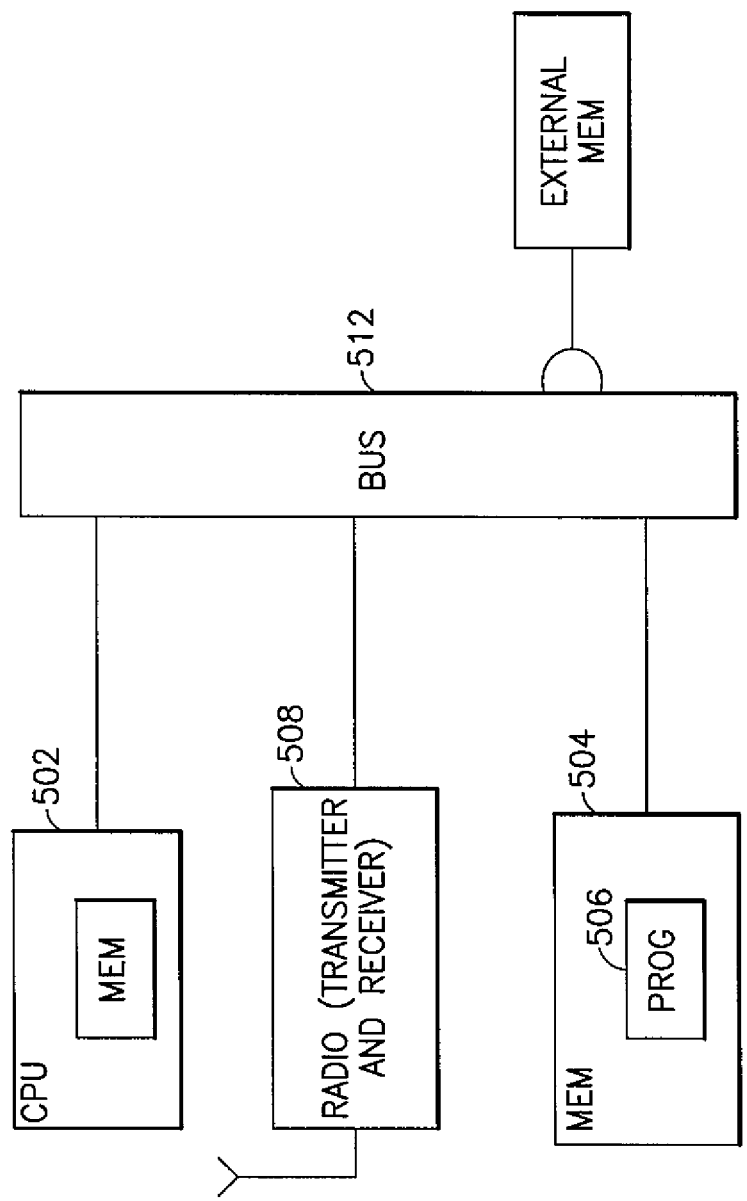

MAXIMIZATION OF RADIO RESOURCE ALLOCATION FOR A CARRIER AGGREGATED USER EQUIPMENT

TECHNICAL FIELD

The invention relates generally to wireless communications, and more particularly concerns allocating radio resources for cellular communications across multiple component carriers or cells of a radio network using carrier aggregation. Specific examples are in the context of some user equipments (UEs) being scheduled for resources on multiple LTE cells in a manner that balances loading across those cells, and which results in both better resource utilization across the multiple cells and a 'fatter' date pipe/higher throughput for users operating on multiple LTE cells at once.

BACKGROUND

A listing of acronyms used herein follows the detailed description section below. In current cellular radio environments there may be various user equipments (UEs) that are operating/coexisting in a given cell that have different capabilities. For purposes of the examples herein these different capabilities may be concisely summarized as UEs operating under 3GPP Release 8/9 and those operating under 3GPP Release 10. Release 10 enables UEs to operate simultaneously on multiple cells in what is termed Carrier Aggregation (CA) mode. In carrier aggregation the bandwidth available for use by the wireless network is divided into multiple component carriers; a given Release 10 UE may be operating on one component carrier designated as a primary cell (Pcell) and one or more further component carriers designated as secondary cells (Scells). Other Release 10 UEs may be operating in a non-CA mode and thus on only one carrier/cell. For conciseness, herein these are referred to as non-CA UEs while those UEs for which there are two or more configured and activated component carriers are CA UEs. In this environment the Release 8/9 UEs operate on only one component carrier/cell.

Data transmitted to any of these UEs is over a data radio bearer, termed herein as a data bearer for brevity. Data bearers may or may not have an associated guaranteed bit rate. A data bearer assigned to a given CA UE may be served by any one or more of the CA UE's multiple active cells. In this manner data bearers are associated with a given UE rather than with a given cell; a single data bearer assigned to a given CA UE may carry data to or from that UE on all of that CA UE's active cells or only one or some of them. In general a given UE can have more than one data bearer active at a given time, for example one high priority data bearer for voice communications and another low priority data bearer for social networking data updates.

One cellular access technology by the 3GPP is E-UTRAN, also known as LTE. In LTE the radio access node (traditionally termed a base station) is known as an eNodeB or eNB, and handles scheduling of uplink and downlink (UL and DL) radio resources for the various active UEs under its control. Conventional practice in LTE for allocating available radio resources by the eNodeB scheduler is somewhat simplistic in that it distributes resources for the CA UE's data equally among that CA UE's serving cells, or in some configured proportion. An example of this is shown at FIG. 2, using the example data bearers and associated UEs in Cell-1, Cell-2 and Cell-3 as listed in FIG. 1.

In this example UE2 through UE7 are either legacy (Rel. 8/9) UEs that are not CA compatible and are CA compatible (Rel 10) but are presently operating on only one cell. UE1 is the only CA UE and it is active in Cell-1, Cell-2 and Cell-N, so it can get data on its associated data bearer #1 in any one or more of its three serving cells.

FIG. 2 illustrates one prior art technique in which the data for UE1 is equally distributed across its three cells by the eNodeB scheduler. The data to be scheduled in FIG. 2 for UE1 is denoted as packets #1 through #6. Consider each shaded block in the cell-specific tables of FIG. 2 as one physical resource block (PRB) allocated to the correspondingly shaded UE, where the unshaded PRBs are un-allocated and thus go unused. Cell-2 is relatively heavily loaded due to the data volume demands of UE4 and UE5, while Cell-1 is lightly loaded due to lesser data volumes for UE2 and UE3. In FIG. 2 there are 24 PRBs allocated to UE1 in each of its three cells for the illustrated transmission time interval (TTI). Equally distributing resources being allocated to the CA UE1 across all three of its cells means Cell-2 and to a somewhat lesser extent Cell-N are crowded, as compared to the lightly loaded Cell-1. Cell-2 being most heavily loaded spreads out the scheduling of the CA UE1 data in the time domain (horizontal axis) resulting in this data experiencing higher delay. For UE1, packets #2 and #5 are shown in FIG. 2 as being sent in the resources allocated in Cell-2 and experience a longer delay than the packets #1 and #4 for which resources are allocated in Cell-1, which is sparsely loaded as is evident from the larger number of unallocated PRBs and so remains under-utilized.

Since the data volume to be scheduled in any given cell in a CA system is for multiple UEs of which any number of them may not be active in all cells, in this prior art scheduling technique at any point in time the serving cells would nearly always be differently loaded and utilized. The example of FIG. 2 shows how this could result in sub-optimal scheduling of a CA UE across its multiple cells. This can also adversely impact the CA user's experience of a 'fatter pipe' for its data in terms of throughput and delay.

What is needed in the art is a mechanism to better utilize the available network resources when scheduling data across multiple cells when at least one data bearer of a UE is active on one or more of those cells.

SUMMARY

Certain embodiments of the present invention are directed to an apparatus such as a radio network access node which in the LTE system is known as an eNodeB and is where the scheduler of network resources resides. Other embodiments are directed to a method and a computer readable memory that implements such a network scheduler to schedule user equipments as detailed further below.

According to one aspect there is a method of scheduling user equipments (UEs) in a scheduling period. In this aspect the method comprises:

for each of X cells in a carrier aggregation system where X is an integer greater than one, determining relative priorities of a plurality of data bearers, each data bearer associated with a respective UE having buffered data and at least one of the UEs is a carrier-aggregated UE that is allowed radio resource allocation to its associated data bearers in at least two of the cells;

for each of the carrier-aggregated UEs, distributing the buffered data across all the data bearers of the respective carrier-aggregated UE across those cells in which the respective carrier-aggregated UE and its associated data bearers are allowed radio resource allocation, using a measure of total data throughput for each of those cells;

for each of the X cells, allocating radio resources to the data bearers according to the determined relative priorities, such that for each respective carrier-aggregated UE the radio resources allocated to its associated data bearer across those cells in which the respective carrier-aggregated UE is allowed radio resource allocation, are sufficient to carry the buffered data as distributed for said respective carrier-aggregated UE; and transmitting, to each of the UEs that are associated with one or more of the data bearers for which radio resources are allocated during the scheduling period, a schedule indicating the allocation of the radio resources.

An electronic device or other such apparatus embodying the teachings herein may comprise at least one digital processor and a computer readable memory storing a computer readable program/computer executable code which when executed by the at least one processor, causes the device to schedule user equipments (UEs) in a scheduling period by at least the actions described in first three bullets listed above. Other embodiments implementing these teachings may comprise the computer readable memory on which is stored such a program or executable code and distributed to end users, either as separate software or pre-stored in a memory of an electronic device.

BRIEF DESCRIPTION OF THE DRAWINGS

FIG. 5 is a high level schematic block diagram illustrating relevant portions of an electronic computing device such as a radio network access node with a radio resource scheduler that is suitable for practicing the described and exemplary embodiments of these teachings.

DETAILED DESCRIPTION

Figure 1:
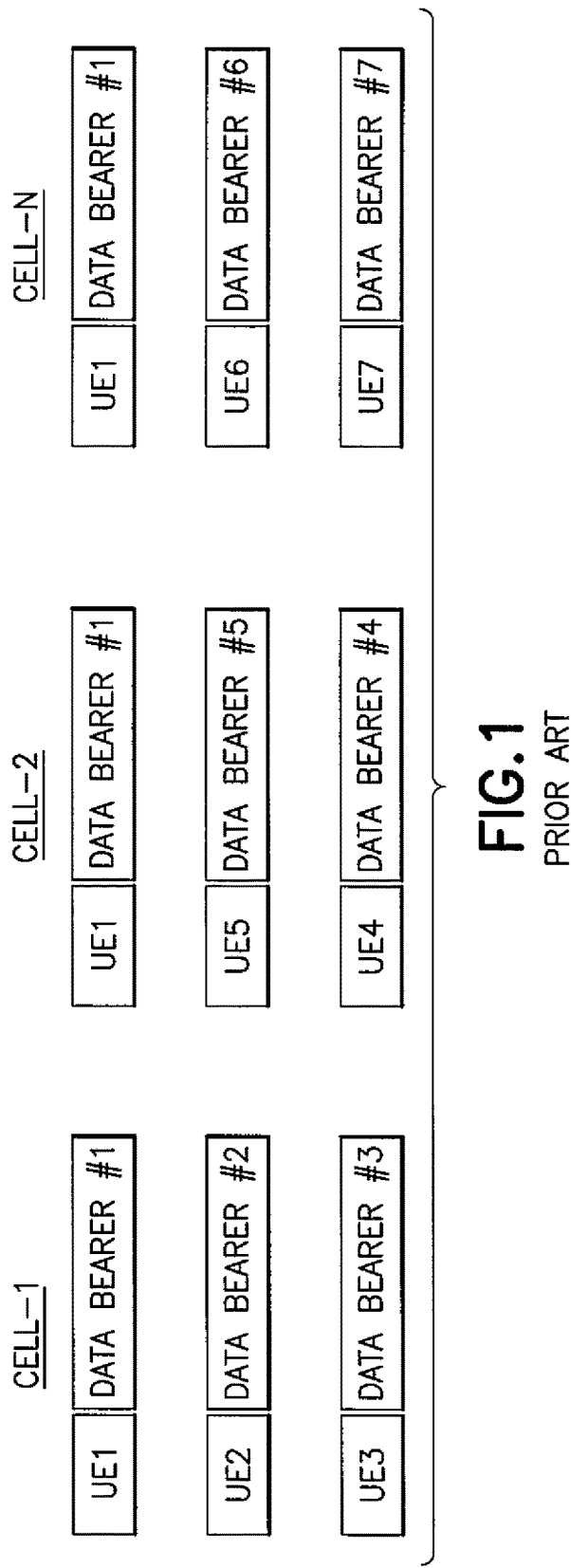
FIG. 1 is a block illustration showing three cells in which there are various data bearers associated with respective user equipments, for use with the various examples herein.

Reference is made herein to particular features (including method steps) of the invention or of specific embodiments thereof. Such various features may be combined regardless that the description herein does not explicitly explore every such possible combination. The specific embodiments that are detailed with particularity below are not a limit to the general teachings herein, and such embodiments by themselves are not a limit to the scope of the ensuing claims but rather teach the principles of the invention and illuminate the meaning of such ensuing claims.

In general terms the examples below have the scheduler of wireless network resources dynamically determining how to allocate resources across multiple cells and to multiple UEs, at least one of which has more than one of those cells as its serving cells. Such a UE is referred to herein as a CA UE for brevity. Embodiments of these teachings allocate these network resources to distribute the CA UE's data across its multiple serving cells in such a way so as to maximize throughput of the CA UE, and also to maximize the network capacity by more uniformly loading its cells. As compared to prior art techniques aimed at uniformly distributing the CA UE's resource allocations among that UE's cells, this technique of more uniform loading across cells avoids wasted resources in less loaded cells and also avoids UEs being starved of resources in overloaded cells. The dynamic determination finds the proportion of the CA UE's pending data to be distributed in each of those multiple cells, and this dynamically determined proportion changes over time based on the potential of a CA UE being served better (sooner) and with a higher throughput in a given serving cell as compared to other of that CA UE's serving cells. This dynamically determined proportion is also based on utilization and loading of the CA UE's multiple serving cells. In the specific examples below the potential of a CA UE to achieve a higher data throughput in a given serving cell depends on the quality of the radio channel of the CA UE for that serving cell, the relative priority of the CA UE in that serving cell with respect to other UEs in that serving cell, and the loading and utilization of that serving cell by the other UEs in the serving cell.

The examples below assume scheduling of downlink (DL) resources, where the eNodeB scheduler is directly aware of how much data is in queue for it to send to each of the UEs under its control, but the broader teachings herein apply also for scheduling of uplink (UL) resources. Different cellular access technologies may use different techniques but in general the scheduler of radio resources in a given wireless radio network will know, at least approximately, how much UL data is in queue to be sent from each UE under its control. As one non-limiting implementation of how the network can obtain this knowledge, the UTRAN and E-UTRAN technologies have the UEs provide the network with UL buffer status reports indicating UL buffer occupancy for each of the UE's active data bearers; such UL buffer status reports are sent periodically or at certain events such as new data being available or expiry of a timer.

The following definitions provide a clearer context for the more specific examples below of downlink scheduling. Active UEs refer to UEs having downlink data pending for transmission by the eNodeB, or UL data for transmission to the eNodeB. A UE may have an ongoing active connection to the network (e.g., it is in a connected mode or state) but if the network has no data in this UE's DL buffer or the UE has no data in its UL buffer then the UE is not 'active' in the manner this term is used herein for scheduling and resource allocation purposes. If a UE is active, then at least one of the data bearers associated with it is active though if a UE is associated with multiple data bearers simultaneously they need not all be active at the same time. Serving cells of the UEs are the cell or cells which are activated, meaning transmission of user data is possible in the cell with this UE. A CA UE can have more than one, and in current iterations of the LTE system up to five, serving cells. In the LTE system the cell through which the UE established its radio resource control (RRC) connection to the eNodeB is known as the Primary Cell (Pcell) while other serving cells are known as Secondary Cells (Scells). A non-CA UE can have only one serving cell. In the description below it is assumed for convenience that a single eNodeB controls all the serving cells of the described CA UEs.

The eNodeB scheduler allocates radio resources for the various UEs' data bearers dynamically for each scheduling period. In the LTE system the normal scheduling period is one transmission time interval (TTI) which lasts 1 ms, though in other radio access technologies and/or in future developments of LTE the defined scheduling period may differ or may be known by another name. In the LTE system the UEs are given their resource allocations by means of a Physical Downlink Control Channel (PDCCH), though of course the particular scheduling mechanism may differ in other and/or future radio access technologies. Different UEs may be assigned to look in different time windows for a PDCCH bearing their resource allocations, so the eNodeB scheduler may send multiple PDCCHs to allocate all of the resources in a given TTI.

Figure 2:
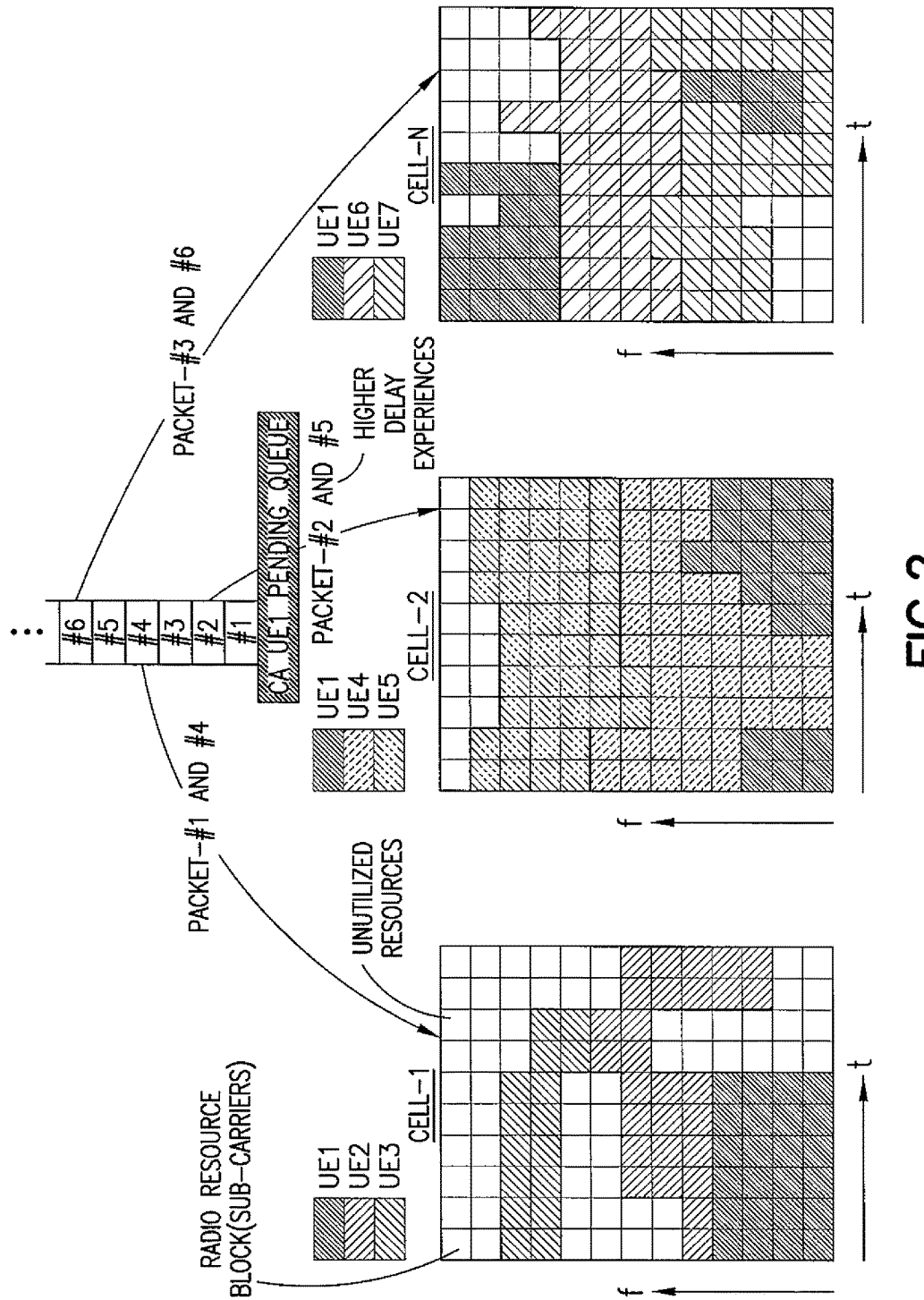
FIG. 2 is a diagram illustrating resource allocations across Cell-1, Cell-2 and Cell-N for the UEs mentioned at FIG. 1, according to a prior art equal distribution of resources for the CA UE1 across all of its serving cells.
Figure 3:
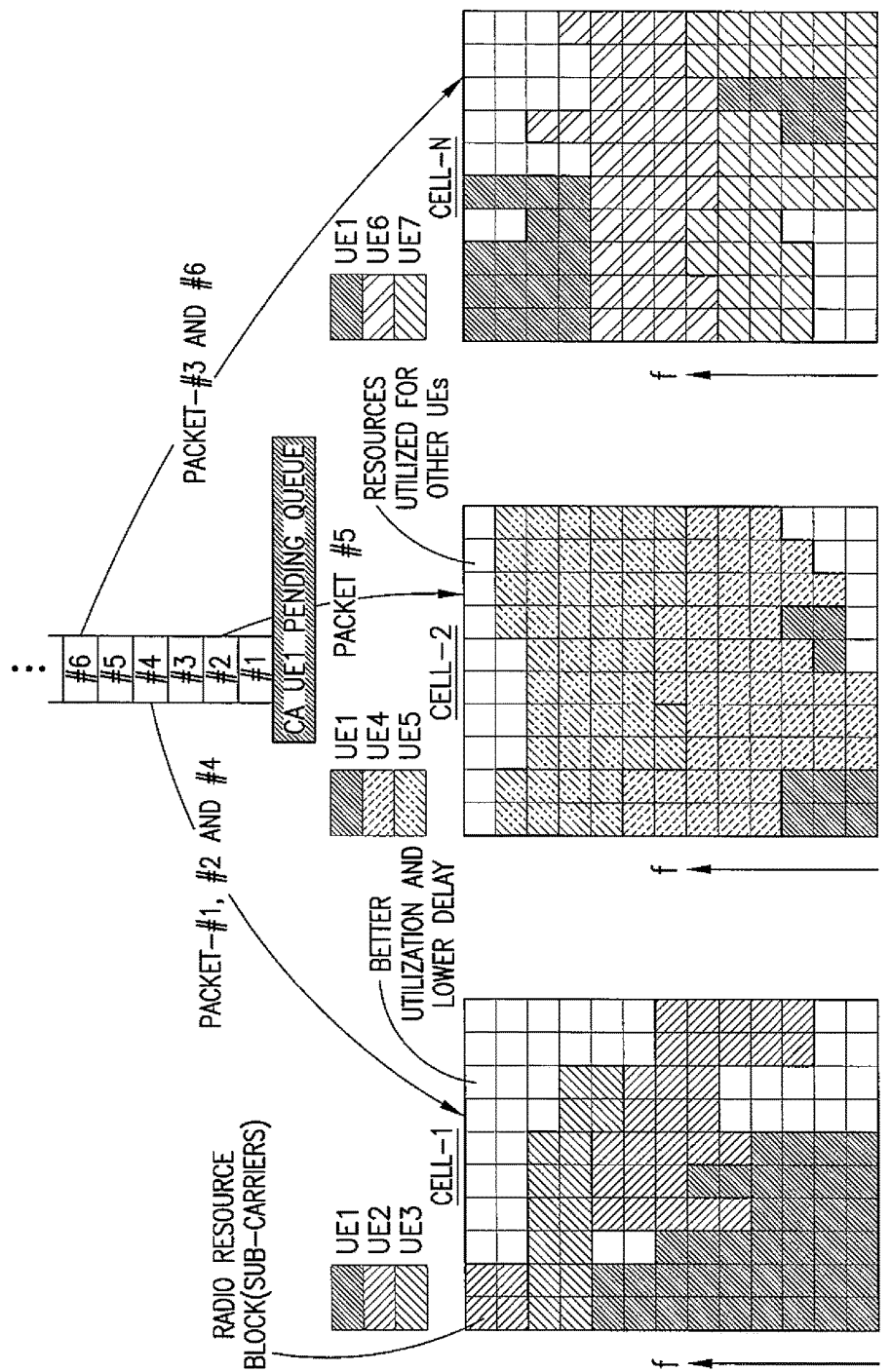
FIG. 3 is a diagram similar to FIG. 2 but illustrating resource allocations across Cell-1, Cell-2 and Cell-N for the same UEs according to one example embodiment of the invention.

FIG. 3 is a diagram similar to FIG. 2 but illustrating resource allocations across Cell-1, Cell-2 and Cell-N for the same UEs shown at FIG. 1 according to one example embodiment of the invention. This differs from the conventional equal-distribution per cell of the CA UE1 shown at FIG. 2 from both the network's and the CA UE1's perspective. From the network's perspective the dynamic distribution of allocated resources for all the active UEs is more evenly distributed, better avoiding congestion in any given cell. From the CA UE's perspective the overall delay experienced by the CA UE1 data is reduced as compared to the conventional technique described at FIG. 2. Resources freed up in Cell-2, as compared to Cell-2 at FIG. 2, are utilized in FIG. 3 by other UEs resulting in a better quality of service (QoS) experienced by those other UEs as well.

FIG. 3 illustrates that CA UE1 is active in Cell-1, Cell-2 and Cell-N. Activation and deactivation of the CA UE's Scells is generally controlled by the network. In conventional practice for the LTE system a CA UE can be configured with a Pcell and also with multiple Scells, but that CA UE only receives (or sends) data on those configured Scells which are also activated for that CA UE. The Pcell is always activated for a given UE. These teachings can be utilized by the network to additionally determine when a configured Scell should be activated for a CA UE, and also to determine when a given configured and activated Scell should be deactivated for a CA UE. According to an embodiment of these teachings, a new configured Scell of a CA UE is activated only when the pending data of that CA UE, across its active data bearers, exceeds a (first) threshold. Such a threshold for an $i^{th}$ Scell is hereafter termed "threshold-act-level-i", and in one implementation this threshold is a network-configurable percentage of the radio resource utilization of its currently serving cells. An activated Scell of a CA UE is de-activated when the pending data of the CA UE, across its active data bearers, falls below a (second) threshold. Such a threshold for an $i^{th}$ Scell is hereafter termed "threshold-deact-level-i", and this deactivation threshold may also be a network-configurable percentage of the radio resource utilization of its currently serving cells. The index i shows that these thresholds are per cell, and so for a given CA UE configured with a set of Scells there will be a set of activation threshold values and a set of deactivation threshold values corresponding to that set of configured Scells. When a given CA UE's pending data causes its radio resource utilization to increase up to threshold-act-level-2 the network will activate Scell-2 for that CA UE, when its pending data causes its radio resource utilization to decrease to threshold-deact-level-1 the network will deactivate Scell-1 for that CA UE, and so forth.

Generally the eNodeB considers active UEs, both CA and non-CA UEs, independently for scheduling purposes in each of its serving cells based on a weighted priority which is calculated using scheduling parameters. For example, the eNodeB scheduler in one example calculates for all active UEs the weighted priority by using multiple scheduling factors including radio data bearer priority, packet delay, channel quality and amount of pending data for the UE. The scheduling parameters are bearer-specific, and for carrier aggregated UEs the weighted priority is calculated in each of the CA UE's corresponding serving cells. For a given UE having pending data for more than one data bearer in a given cell such as two data bearers with different priorities and/or bit rate/quality of service guarantees, the eNodeB scheduler computes a weighted priority for each of those bearers using the above scheduling parameters and using the amount of data pending for the respective data bearer.

For a given scheduling interval (1 ms in LTE), in each cell the active data bearers of the UEs are selected for scheduling in the order of their weighted priority. The amount of pending data for a CA UE's data bearer is determined independently for each serving cell of that CA UE's data bearer, and is based on a configured and dynamically adapted value. These configured and dynamically adapted values are used to determine the proportion of pending data to be served across multiple serving cells. While these dynamically adapted values are per UE, the determined proportion is applied independently to each of the UE's data bearers on its pending data.

Assume for the FIG. 3 example that the weighted relative priorities of the data bearers associated with the UEs indicated at FIG. 3 are as follows:

|  | Cell-1 | Cell-2 | Cell-N |
|---|---|---|---|
| highest priority | UE1 | UE5 | UE6 |
|  | UE3 | UE4 | UE1 |
| lowest priority | UE2 | UE1 | UE7 |

In Cell-1 the data bearer associated with UE1 is the highest relative weighted priority, while in Cell-2 it is the lowest and in Cell-N it is neither highest nor lowest. These relative priorities for a given cell are determined without regard to the amount of pending data that will be scheduled in that cell, and are used for the order of scheduling resources for the active UEs in a given cell rather than for determining how much data is to be scheduled for a given UE in that cell.

FIG. 3 is similar to FIG. 2 with regards to the UEs and the specific amounts of data for them that is being scheduled, but FIG. 3 shows resources scheduled/allocated according to these teachings rather than distributing the CA UE1's data equally among all of UE1's serving cells as does FIG. 2. Allocations for UE3 in Cell-1 and for UE5 in Cell-N are the same in both FIGS. 2 and 3 and will not be further discussed, though this is only an anomaly of this specific example and not a grounding principal of these teachings.

In view of the high loading in Cell-2 due to data for UE4 and UE5 relative to the data in Cell-1 due to UE2 and UE3, the proportion of CA UE1's pending data that is scheduled for Cell-1 will be greater than that for Cell-2. In Cell-1 the CA UE1's data is spread over 39 PRBs; and in Cell-2 the CA UE1's data is spread over only 9 PRBs. Compare this against the 24 PRBs in each of Cell-1 and Cell-2 for CA UE1's data in the equal-distribution scheduling technique shown at FIG. 2. It happens that the total amount of CA UE1's data in Cell-N, and the resources scheduled for it, is the same in both FIGS. 2 and 3; this is an anomaly and is specific to this example rather than a principal of operation for these teachings. Across all of CA UE1's serving cells there is a reduction in delay for its data, since in the FIG. 2 technique the latest data is scheduled in the tenth-in-time PRB of Cell-2 whereas in the example of FIG. 3 the latest data is scheduled in the eighth-in-time PRB of Cell-N; note also that the delay in Cell-2 for UE1's data is reduced to the seventh-in-time PRB.

Note that in this example UE2 and UE3 in Cell-1, UE4 and UE5 in Cell-2, are all non-CA UEs and so there is no opportunity to move any amount of their data to a different cell. If any of them were a CA UE, then like this example for CA UE1 their proportional data distribution among their respective serving cells can also be considered in making the radio resource allocations so as to better utilize network resources and limit data delays.

Understanding the distinction in results as between FIGS. 2 and 3, now are described some principals and specific implementations to achieve the FIG. 3 scheduling results. In the scheduling/allocation of radio resources according to an embodiment of these teachings, the proportion in which the amount of pending data for each serving cell of a CA UE is divided is based on a configured parameter. This proportion is used at the start of scheduling of that CA UE when the CA UE has more than one serving cells.

In one example the proportion in which the amount of pending data for a CA UE for each of its serving cells is divided for scheduling in the respective cell is determined based on the served throughput, which is normalized with total served throughput in the serving cell averaged over a window. Equation [1] below is one way to implement this normalized served throughput:

$$Pending\text{-}Data\text{-}Distr\text{-}UE(i,j) = \frac{Cell\text{-}Alloc\text{-}Det\text{-}Ratio\text{-}UE(i,j)}{\sum_{j=1}^{L} Cell\text{-}Alloc\text{-}Det\text{-}Ratio\text{-}UE(i,j)} \quad [1]$$

In Equation [1] above:
Pending-Data-Distr-UE(i, j) defines the proportion of pending data for the $i^{th}$ CA UE in the $j^{th}$ serving cell, i and j being indices. In the FIG. 3 example there is only one CA UE (UE1) and for this i=1 CA UE there are L=3 serving cells Cell-1, Cell-2 and Cell-N, where j indexes from 1 through L.
Cell-Alloc-Det-Ratio-UE(i,j) is the radio resource allocation determination ratio for the $i^{th}$ CA UE in the $j^{th}$ serving cell. In one example this may be determined according to equation [2] below:

$$Cell\text{-}Alloc\text{-}Det\text{-}Ratio\text{-}UE(i,j) = \frac{Avg\text{-}Thpt\text{-}UE(i,j)}{Avg\text{-}Total\text{-}Served\text{-}Thpt\text{-}Cell(j)} \quad [2]$$

In equation [2] above:
Avg-Thpt-UE(i,j) is the average throughput for the $i^{th}$ CA UE in the $j^{th}$ serving cell across all its active data bearers and as one non-limiting example is defined in equation [3] below.
Avg-Total-Served-Thpt-Cell(j) is the average total throughput of the $j^{th}$ serving cell across all the UEs and as one non-limiting example is defined in equation [4] below.

The denominator in equation [1] above defines the sum of radio resource allocation determination ratios of the $i^{th}$ CA UE across all of its L serving cells. In current practice for the LTE radio access technology the maximum number for L=5, but the actual value for L in practice for a given $i^{th}$ CA UE will be the number of serving cells of the CA UE. In LTE the above serving cells is sometimes referred to as the component carriers which are both configured and activated for a given UE.

Equation [1] above gives that proportion of distribution of queue load across the serving cells which is based on the utilization of a serving cell and how good is the priority of the UE (i.e., its associated data bearers) in that serving cell due to several priority determining factors (for example, the scheduling factors mentioned above). These priority determining factors result in the subject UE being relatively better or worse than other UEs; for example due to better radio conditions, other UEs in a particular serving cell have lower priority data bearers, lower throughput, and the like. So if a UE is being served better (that is, with a higher throughput) in a particular cell and that cell is also less heavily loaded than other cells, then a higher proportion of a that UE's buffered data goes to that less heavily loaded cell. This is shown at FIG. 3 where a higher proportion of the CA UE1's buffered data goes to lightly loaded Cell-1 as compared to more heavily loaded Cell-2. If instead the cell being considered is more heavily loaded, then the proportion of buffered data is less as FIG. 3 illustrates with the relatively lower amount of CA UE1's data going to Cell-2. If the cell is less loaded but the UE cannot be served well, then again a lesser proportion of the UE's data would go that that poorer serving cell.

The Cell-Alloc-Det-Ratio-UE(i, j) for the $i^{th}$ carrier-aggregated UE in the $j^{th}$ cell in equation [1] above accounts for the $i^{th}$ carrier-aggregated UE being served with a higher throughput in a different cell. As noted above one way to do this is for one or more of the priority determining factors to be considered when computing this ratio. This ratio also considers the average loading of the $j^{th}$ cell, which equation [2] shows explicitly.

The window over which the past normalized served throughput is averaged is in one embodiment of these teachings configurable by the radio network itself. The average served throughput for a UE in a serving cell is in one non-limiting example the total number of bytes scheduled across all the data bearers of a given UE over different scheduling occasions for the UE in the averaging window, for which equation [3] below is one example:

$$Avg\text{-}Thpt\text{-}UE(i,j) = \frac{1}{N}\sum_{n=1}^{N}\sum_{k=1}^{M} NbrSchdBytesActBearer(k,n) \quad [3]$$

In equation [3] above:
NbrSchdBytesActBearer(k,n) is the number of bytes scheduled in the $j^{th}$ serving cell of the $k^{th}$ data bearer of all the M data bearers of the $i^{th}$ CA UE during an $n^{th}$ scheduling interval, each scheduling interval being one millisecond in this example.
M represents a total number of data bearers scheduled for the $i^{th}$ CA UE in the $j^{th}$ cell during the $n^{th}$ scheduling interval and is indexed by k. The value of M can range from 1 to 8 under current LTE specifications.
N is the total number of scheduling intervals in milliseconds which defines the configurable averaging window size, and is indexed by n.

The average total served throughput of a serving cell is in this non-limiting example the total number of bytes scheduled across all data bearers of all the UEs being served in that serving cell and is determined on the basis of the total number of physical resource blocks (PRBs) that are utilized at maximum/best modulation and coding scheme (MCS) in that serving cell across all scheduling periods over the averaging window. Equation [4] below is one example for calculating this average:

$$Avg\text{-}Total\text{-}Served\text{-}Thpt\text{-}Cell(j) = \frac{1}{N}\sum_{n=1}^{N} NbrPRBAlloc(n) \times Highest\text{-}MCS \quad [4]$$

In equation [4] above:

NbrPRBAlloc(n) is the total number of radio resources allocated in the $j^{th}$ serving cell in terms of frequency sub-carriers across all UEs (both CA and non-CA UEs) in the $n^{th}$ scheduling interval.

Highest-MCS is the highest usable modulation and coding scheme for the network's radio access technology (note this may differ as between downlink and uplink)

N is the total number of scheduling intervals in milliseconds which defines the configurable averaging window size and is indexed by n, same as was used in equation [3].

The highest MCS of equation [4] above is specific for the $n^{th}$ scheduling period in the $j^{th}$ cell and using the highest MCS means equation [4] gives the maximum average throughput rather than the actual throughput averaged among the PRBs. For determination of the Cell-Alloc-Det-Ratio we are interested in how many radio resources or PRBs are being utilized across all of the UEs served by that cell to get an estimate of the loading of that cell to ensure that a carrier-aggregated UE utilizes a lesser number of radio resources from a higher loaded cell (i.e., a cell with higher PRBs being utilized) serving it. So in equation [4], the highest MCS is used to multiply with the number of PRBs utilized in that cell to convert the number of PRBs utilized to throughput or bit-rate and to use it to normalize the Avg-Thpt-UE(i,j) served to the UE in that cell with respect to the overall loading of that cell. Using the highest MCS ensures that MCS values of different UEs as per the radio channel quality they experience in different cells does not have an impact and cell loading as measured by number of PRBs utilized remains the determining factor.

The above more specific implementations ensure the results shown in FIG. 3 as compared to FIG. 2, namely that the pending data of a CA UE's data bearers would be distributed such that more data is handled on the less loaded serving cell as compared to a more loaded serving cell. In these examples the data of a CA UE is distributed inversely to the cell loading so that all the cells are more uniformly loaded, and at the same time the CA UEs throughput can be maximized and its data delays minimized.

Certain embodiments and implementations of these teachings provide advantages in that the network scheduler, specifically in LTE the eNodeB scheduler, load balances the allocation of radio resources for the data bearers of a CA UE across its multiple serving cells (or multiple CA UEs if there are more than one being scheduled in a given scheduling interval) to maximize the usage of radio resources within the eNodeB across its multiple cells. By scheduling more data in the serving cells where the CA UE has the potential for higher throughputs and which are less heavily loaded, the overall delay that the CA UE's data experiences also decreases which improves the CA UE user's experience. Another technical effect is that offloading more of the CA UE's data to a less utilized serving cell, as compared to the prior art equal-distribution technique described above with reference to FIG. 2, would free up resources in a more heavily loaded serving cell and these freed resources can then be utilized to serve better other UEs served only by that cell, such as to better serve UE4 and UE5 in Cell-2 of the FIG. 3 example above.

Figure 4:
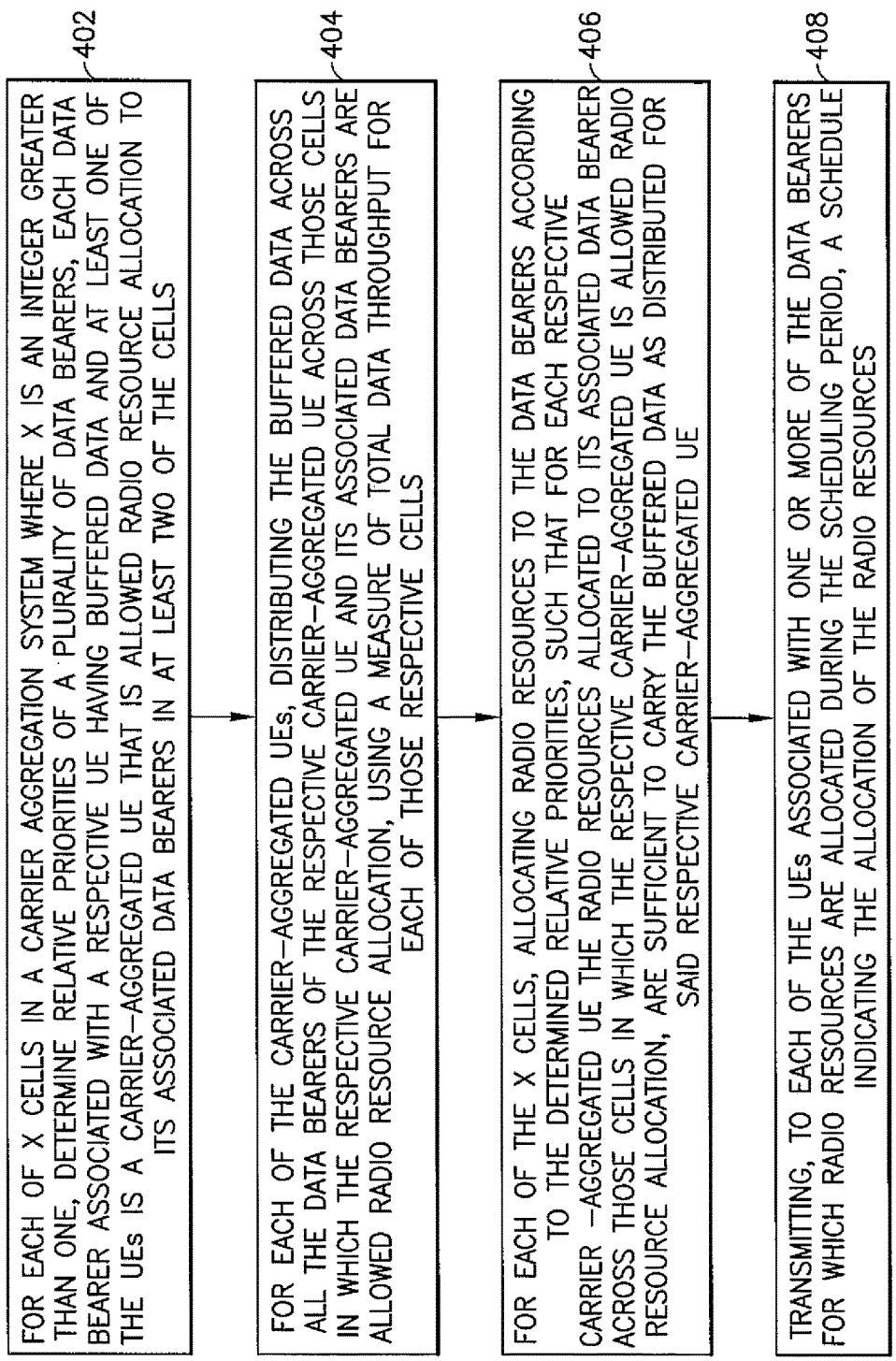
FIG. 4 is a process flow diagram showing a method and operation of an electronic device for scheduling user equipments (UEs) in a scheduling period, according to certain exemplary embodiments of these teachings.

FIG. 4 is a flow diagram illustrating certain steps in the process according to an embodiment of these teachings for scheduling user equipments (UEs) in a given scheduling period. FIG. 4 recites from the perspective of the eNodeB scheduler. In one implementation the steps of FIG. 4 are repeated by the eNodeB scheduler at least for each scheduling period in which there is one or more CA UEs that have queued/buffered uplink data or for which the network has queued/buffered downlink data. For each of X cells in a carrier aggregation system, block 402 has the network resource scheduler determining relative priorities of a plurality of data bearers. Each data bearer is associated with a respective UE having buffered data and at least one of the UEs is a carrier-aggregated UE that is allowed radio resource allocation to its associated data bearers in at least two of the cells. For block 402 X is an integer greater than one. Also, a UE 'having' buffered data as block 402 recites is not limited to data locally stored in the UE's own buffer memory but also includes downlink data that is stored in the network's buffer memory associated with that UE for downlink transmission to that UE on resources that are scheduled according to FIG. 4. In one example the relative priorities are weighted priorities, which the network scheduler calculates for all active UEs by using multiple scheduling factors mentioned above such as radio data bearer priority, packet delay, channel quality and amount of pending data for the UE. For carrier aggregated UEs the network scheduler calculates the weighted priority in each of the CA UE's corresponding serving cells.

At block 404, for each of the carrier-aggregated UEs the network scheduler distributes the buffered data across all the data bearers of the respective carrier-aggregated UE across the respective carrier-aggregated UE and its associated data bearers can be allocated radio resources, using a measure of total data throughput for each of those cells. So for example if the network is operating X=5 cells and in a given scheduling period there is only one CA UE1 that is active in L=3 of those cells and all the other UEs are non-CA UEs that are each active in only one of those X=5 cells, then the network scheduler computes the distribution of the buffered data per block 404 for each of the L=3 cells using the total data throughput for each of those respective L=3 cells. Total data throughput for each cell refers to total throughput per cell for all UEs served by that cell.

The examples above detailed several more specific implementations of this distribution of the buffered data. In one implementation the measure of total data throughput mentioned at block 404 for each of those respective cells comprises a total number of bytes scheduled across all data bearers for all UEs in the respective cell over an historical averaging window. If j indexes a total of L=3 cells for a given CA UE (L being a positive integer greater than one), then equation [4] above [Avg-Total-Served-Thpt-Cell(j)] gives for each $j^{th}$ cell a specific algorithm for how the network scheduler computes the average total throughput per $j^{th}$ cell expressed as the total number of bytes scheduled across all data bearers for all UEs in the respective cell over the averaging window.

Also consistent with the above examples, the buffered data of the respective carrier-aggregated UE stated at block 404 is distributed across those cells in which the respective carrier-aggregated UE and its associated data bearers are allowed radio resource allocation by the network scheduler computing, for each respective carrier-aggregated UE, an average served throughput for each said respective cell. An algorithm for computing this per-CA UE average served throughput per cell [Avg-Thpt-UE(i,j)] is shown at equation [3] above, where each carrier-aggregated UE that has buffered data to be scheduled is indexed by i, each cell in which that $i^{th}$ CA UE has an associated data bearer that is allowed radio resource allocation is indexed by j, and in the $j^{th}$ cell the $i^{th}$ CA UE has a total of M data bearers being scheduled which are indexed by k (M is an integer at least one).

The above example also satisfies the CA UE buffered data distribution among its associated data bearers at block 404 by determining a proportional amount of the CA UE's total buffered data that is to be put in that UE's data bearers in the different cells in which those data bearers lay. More particularly, equation [1] is an exemplary algorithm for calculating the proportional amount of the buffered data for the CA UE's data bearer per cell based on served throughput for an $i^{th}$ carrier-aggregated UE in a $j^{th}$ cell, normalized with total served throughput in the $j^{th}$ cell and averaged over an historical window. The radio resource allocation determination ratio for the $i^{th}$ CA UE in the $j^{th}$ serving cell [Cell-Alloc-Det-Ratio-UE(i,j)], which is needed to solve equation [1], is given specifically at equation [2] above and the average total throughput of the $j^{th}$ cell across all the UEs [Avg-Total-Served-Thpt-Cell(j)] used in the denominator of equation [2] is found using equation [4] above to satisfy the total data throughput for each cell that block 404 states. The radio resource allocation determination ratio for the $i^{th}$ CA UE in the $j^{th}$ serving cell [Cell-Alloc-Det-Ratio-UE(i,j)] accounts for the average loading of the $j^{th}$ cell as well as the possibility that the $i^{th}$ carrier-aggregated UE may be served with a higher throughput in a different cell.

Returning now to FIG. 4, block 406 provides that for each of the X cells, the network scheduler allocates radio resources to the data bearers according to the determined relative priorities, such that for each respective carrier-aggregated UE the radio resources allocated to its associated data bearer across those cells in which the respective carrier-aggregated UE is allowed radio resource allocation are sufficient to carry the buffered data, as distributed according to block 404, for the respective carrier-aggregated UE. Finally at block 408 the network scheduler transmits, to each of the UEs that are associated with the data bearers for which radio resources are allocated during the scheduling period, a schedule indicating the allocation of the radio resources to a given one of the UEs. Each UE therefore gets a schedule indicating the radio resources that are allocated per block 406 to the data bearer or bearers associated with this UE. In the LTE system the scheduling period is one TTI=1 ms, and in practice the various UEs may be addressed by different schedules which are sent in different time slots of the PDCCH. Different UEs are instructed to blindly detect different time slots of the overall PDCCH logical channel to see if there is a schedule addressing them. Currently in LTE each distinct PDCCH schedule can have a maximum of one allocation per UE per cell, and allocations for multiple UEs are limited by the PDCCH capacity. So to account for all of the radio resources allocated at block 406 for a single scheduling interval the network may send different schedules to different ones of those UEs, where no individual one of those schedules has all of the resource allocations. Different UEs being scheduled may even receive their schedules from different cells, and as mentioned above different UEs in a same or different cell may receive their respective PDCCH at slightly offset times. In this regard, it is the single network scheduler which controls all of the radio resources being scheduled in the various X cells that does the 'transmitting' recited at block 408, regardless that different remote radio heads or other distinct transmission points may actually embody the antenna that wirelessly sends these different schedules on the air link. This is because it is the network scheduler that directs and controls such sending by these different transmission points and which decides the content of these different PDCCH schedules and for which TTI the PDCCH schedules apply.

The logic diagram of FIG. 4 may each be considered to illustrate the operation of a method, and a result of execution of a computer program stored in a computer readable memory, and a specific manner in which components of an electronic device are configured to cause that electronic device to operate. The various blocks shown in FIG. 4 may also be considered as a plurality of coupled logic circuit elements constructed to carry out the associated function(s), or specific result of strings of computer program code or instructions stored in a memory.

As shown in the high level block diagram of FIG. 5 a computing system or device is shown, which includes processing means such a central processing unit (CPU) 502 (more generally at least one processor) that may be implemented as a general processor, an application specific integrated circuit (ASIC), a digital processor and the like; storing means such as at least one computer-readable memory (MEM) 504 storing at least one computer program (PROG) 506 having computer executable code, and communication means 508 such as a radio having a wireless transmitter, receiver, antenna, and associated circuitry such as baseband processor, amplifiers, filters, digital to analog and analog to digital converters, and the like for implementing radio functionality. All these components are connected to communicate with one another through a bus 512. The network scheduler in the network eNodeB mentioned above may be implemented by the CPU 502 and the memory 504 with the stored program 506. Also stored in the MEM 504 at reference number 506 are the computer code or computer implementable algorithm(s) for the computer system/device to operate according to these teachings as detailed by the above-described exemplary embodiments. Such a computer system/device may be implemented as an eNodeB, a base station, a remote radio head, a central network entity controlling multiple eNodeBs and/or radio heads, and the like.

The computer readable memory 504 may comprise a random access memory (RAM) and a mass storage, and may be embodied as memory resident in the device or as an external memory as shown that is removable from the device. Various embodiments of the computer readable MEMs 504 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like.

The CPU 502 and the memory 504 are shown as separate components, however in some embodiments the memory 504 may be integrated with the at least one CPU 502 on a single chip, as shown in FIG. 5 as one non-limiting example. In some embodiments, the memory 504 may be shared dynamically by the CPU 502 and by other processors not implementing these teachings. In some embodiments, the CPU 502 may be operating in either single precision floating point (32-bit) or double precision floating point (64-bit) format.

The following acronyms are used herein:
carrier aggregation CA
downlink DL
dynamic random access memory DRAM
electrically erasable programmable ROM EEPROM
Evolved UMTS Terrestrial Radio Access Network E-UTRAN
Long Term Evolution LTE
millisecond ms
modulation and coding scheme MCS
orthogonal frequency division multiplex OFDM
physical downlink control channel PDCCH
physical resource block PRB
quality of service QoS
random access memory RAM
static random access memory SRAM
Third Generation Partnership Project 3 GPP
transmission time interval TTI
Universal Mobile Telecommunication System UMTS
uplink UL
user equipment UE

What is claimed is:

1. A method of scheduling user equipments (UEs) in a scheduling period, the method comprising:

for each of X cells in a carrier aggregation system where X is an integer greater than one, determining relative priorities of a plurality of data bearers, each data bearer associated with a respective UE having buffered data and at least one of the UEs is a carrier-aggregated UE that is allowed radio resource allocation to its associated data bearers in at least two of the cells;

for each of the carrier-aggregated UEs, distributing the buffered data across all the data bearers of the respective carrier-aggregated UE across those cells in which the respective carrier-aggregated UE and its associated data bearers are allowed radio resource allocation, using a measure of total data throughput for each of those cells;

for each of the X cells, allocating radio resources to the data bearers according to the determined relative priorities, such that for each respective carrier-aggregated UE the radio resources allocated to its associated data bearers across those cells in which the respective carrier-aggregated UE is allowed radio resource allocation are sufficient to carry the buffered data as distributed for said respective carrier-aggregated UE; and transmitting, to each of the UEs associated with one or more of the data bearers for which radio resources are allocated during the scheduling period, a schedule indicating the allocation of the radio resources;

wherein the measure of total data throughput for each of the respective cells comprises a total number of bytes scheduled across all data bearers for all UEs in the respective cell over an historical averaging window such that an average total throughput per $j^{th}$ cell [Avg-Total-Served-Thpt-Cell(j)] is given by:

$$Avg\text{-}Total\text{-}Served\text{-}Thpt\text{-}Cell(j) = \frac{1}{N}\sum_{n=1}^{N} NbrPRBAlloc(n) \times Highest\text{-}MCS$$

where:

NbrPRBAlloc(n) is a total number of radio resources allocated in the $j^{th}$ cell in terms of frequency sub-carriers across all UEs in an $n^{th}$ scheduling period;

Highest-MCS is highest downlink modulation and coding scheme usable in the carrier aggregation system; and N defines a size of the historical averaging window and is indexed by n.

2. The method according to claim 1, wherein the method is performed separately for allocating uplink radio resources and for allocating downlink radio resources.

3. A method of scheduling user equipments (UEs) in a scheduling period, the method comprising:

for each of X cells in a carrier aggregation system where X is an integer greater than one, determining relative priorities of a plurality of data bearers, each data bearer associated with a respective UE having buffered data and at least one of the UEs is a carrier-aggregated UE that is allowed radio resource allocation to its associated data bearers in at least two of the cells;

for each of the carrier-aggregated UEs, distributing the buffered data across all the data bearers of the respective carrier-aggregated UE across those cells in which the respective carrier-aggregated UE and its associated data bearers are allowed radio resource allocation, using a measure of total data throughput for each of those cells;

for each of the X cells, allocating radio resources to the data bearers according to the determined relative priorities, such that for each respective carrier-aggregated UE the radio resources allocated to its associated data bearers across those cells in which the respective carrier-aggregated UE is allowed radio resource allocation are sufficient to carry the buffered data as distributed for said respective carrier-aggregated UE; and transmitting, to each of the UEs associated with one or more of the data bearers for which radio resources are allocated during the scheduling period, a schedule indicating the allocation of the radio resources;

wherein the buffered data of the respective carrier-aggregated UE is distributed across those cells in which the respective carrier-aggregated UE and its associated data bearers are allowed radio resource allocation by computing, for each respective carrier-aggregated UE, an average served throughput for each of those respective cells in which lay its associated data bearer;

and wherein for each $i^{th}$ carrier-aggregated UE and each $j^{th}$ cell in which the $i^{th}$ carrier-aggregated UE has an associated data bearer that is allowed radio resource allocation, the average served throughput [Avg-Thpt-UE(i,j)] is computed as:

$$Avg\text{-}Thpt\text{-}UE(i, j) = \frac{1}{N}\sum_{n=1}^{N}\sum_{k=1}^{M} NbrSchdBytesActBearer(k, n)$$

where:

NbrSchdBytesActBearer(k,n) is number of bytes scheduled for the $k^{th}$ data bearer of a total of M data bearers of the $i^{th}$ CA UE during an $n^{th}$ scheduling interval in the $j^{th}$ serving cell, were M is indexed by k;

M represents a total number of data bearers scheduled for the $i^{th}$ CA UE in the $j^{th}$ cell during the $n^{th}$ scheduling interval and is indexed by k; and N defines a-size of an historical averaging window and is indexed by n.

4. The method according to claim 3, wherein the method is performed separately for allocating uplink radio resources and for allocating downlink radio resources.

5. An electronic device comprising at least one digital processor and a computer readable memory storing a program of computer executable code which, when executed by the at least one processor, causes the device to schedule user equipments (UEs) in a scheduling period by at least:
for each of X cells in a carrier aggregation system where X is an integer greater than one, determine relative priorities of a plurality of data bearers, each data bearer associated with a respective UE having buffered data and at least one of the UEs is a carrier-aggregated UE that is allowed radio resource allocation to its associated data bearers in at least two of the cells;
for each of the carrier-aggregated UEs, distribute the buffered data across all the data bearers of the respective carrier-aggregated UE across those cells in which the respective carrier-aggregated UE and its associated data bearers are allowed radio resource allocation, using a measure of total data throughput for each of those respective cells; and
for each of the X cells, allocate radio resources to the data bearers according to the determined relative priorities, such that for each respective carrier-aggregated UE the radio resources allocated to its associated data bearers across those cells in which the respective carrier-aggregated UE is allowed radio resource allocation are sufficient to carry the buffered data as distributed for said respective carrier-aggregated UE;
wherein the measure of total data throughput for each of the respective cells comprises a total number of bytes scheduled across all data bearers for all UEs in the respective cell over an historical averaging window such that an average total throughput per $j^{th}$ cell [Avg-Total-Served-Thpt-Cell(j)] is given by:

$$Avg\text{-}Total\text{-}Served\text{-}Thpt\text{-}Cell(j) = \frac{1}{N}\sum_{n=1}^{N} NbrPRBAlloc(n) \times Highest\text{-}MCS$$

where:
NbrPRBAlloc(n) is a total number of radio resources allocated in the $j^{th}$ cell in terms of frequency subcarriers across all UEs in an $n^{th}$ scheduling period;
Highest-MCS is highest downlink modulation and coding scheme usable in the carrier aggregation system; and
N defines a size of the historical averaging window and is indexed by n.

6. The electronic device according to claim 5, wherein the computer executable code, when executed by the at least one processor, causes the device to schedule UEs as said separately for allocating uplink radio resources and for allocating downlink radio resources.

7. An electronic device comprising at least one digital processor and a computer readable memory storing a program of computer executable code which, when executed by the at least one processor, causes the device to schedule user equipments (UEs) in a scheduling period by at least:
for each of X cells in a carrier aggregation system where X is an integer greater than one, determine relative priorities of a plurality of data bearers, each data bearer associated with a respective UE having buffered data and at least one of the UEs is a carrier-aggregated UE that is allowed radio resource allocation to its associated data bearers in at least two of the cells;
for each of the carrier-aggregated UEs, distribute the buffered data across all the data bearers of the respective carrier-aggregated UE across those cells in which the respective carrier-aggregated UE and its associated data bearers are allowed radio resource allocation, using a measure of total data throughput for each of those respective cells; and
for each of the X cells, allocate radio resources to the data bearers according to the determined relative priorities, such that for each respective carrier-aggregated UE the radio resources allocated to its associated data bearers across those cells in which the respective carrier-aggregated UE is allowed radio resource allocation are sufficient to carry the buffered data as distributed for said respective carrier-aggregated UE;
wherein the buffered data of the respective carrier-aggregated UE is distributed across those cells in which the respective carrier-aggregated UE and its associated data bearers are allowed radio resource allocation by computing, for each respective carrier-aggregated UE, an average served throughput for each said respective cell;
and wherein for each $i^{th}$ carrier-aggregated UE and each $j^{th}$ cell in which the $i^{th}$ carrier-aggregated UE has an associated data bearer that allowed radio resource allocation, the average served throughput [Avg-Thpt-UE(i,j)] is computed as:

$$Avg\text{-}Thpt\text{-}UE(i, j) = \frac{1}{N}\sum_{n=1}^{N}\sum_{k=1}^{M} NbrSchdBytesActBearer(k, n)$$

where:
NbrSchdBytesActBearer(k,n) is number of bytes scheduled for the $k^{th}$ data bearer of a total of M data bearers of the $i^{th}$ CA UE during an $n^{th}$ scheduling interval in the $j^{th}$ serving cell, were M is indexed by k;
M represents a total number of data bearers scheduled for the $i^{th}$ CA UE in the $j^{th}$ cell during the $n^{th}$ scheduling interval and is indexed by k; and
N defines a size of an historical averaging window and is indexed by n.

8. The electronic device according to claim 7, wherein the computer executable code, when executed by the at least one processor, causes the device to schedule UEs as said separately for allocating uplink radio resources and for allocating downlink radio resources.

9. A computer readable memory on which is stored a computer program comprising executable code which when executed by one or more processors operates to cause a host device to schedule user equipments (UEs) in a scheduling period, the computer program comprising:
code, executable for each of X cells in a carrier aggregation system where X is an integer greater than one, for determining relative priorities of a plurality of data bearers, each data bearer associated with a respective UE having buffered data and at least one of the UEs is a carrier-aggregated UE that is allowed radio resource allocation to its associated data bearers in at least two of the cells;
code, executable for each of the carrier-aggregated UEs, for distributing the buffered data across all the data bearers of the respective carrier-aggregated UE across the respective carrier-aggregated UE and its associated data bearers are allowed radio resource allocation, using a measure of total data throughput for each of those respective cells; and code, executable for each of the X cells, for allocating radio resources to the data bearers according to the determined relative priorities, such that for each respective carrier-aggregated UE the radio resources allocated to its associated data bearers across those cells in which the respective carrier-aggregated UE is allowed radio resource allocation are sufficient to carry the buffered data as distributed for said respective carrier-aggregated UE;

wherein the buffered data of the respective carrier-aggregated UE is distributed across those cells in which the respective carrier-aggregated UE and its associated data bearers are allowed radio resource allocation by determining a proportional amount of the buffered data for each of those respective cells;

wherein the proportional amount of the buffered data for each of those respective cells is determined based on served throughput for an $i^{th}$ carrier-aggregated UE in a $j^{th}$ cell, normalized with total served throughput in the $j^{th}$ cell and averaged over an historical window;

and wherein for each $i^{th}$ carrier-aggregated UE and each $j^{th}$ cell the proportional amount of the buffered data is $$Pending\text{-}Data\text{-}Distr\text{-}UE(i,\ j) = \frac{Cell\text{-}Alloc\text{-}Det\text{-}Ratio\text{-}UE(i,\ j)}{\sum_{j=1}^{L} Cell\text{-}Alloc\text{-}Det\text{-}Ratio\text{-}UE(i,\ j)}$$

where:

Pending-Data-Distr-UE(i,j) defines the proportion of the buffered data for the if $i^{th}$ carrier-aggregated UE in the $j^{th}$ cell; and Cell-Alloc-Det-Ratio-UE(i,j) is a radio resource allocation determination ratio for the $i^{th}$ carrier-aggregation UE in the $j^{th}$ serving cell and is defined as:

$$Cell\text{-}Alloc\text{-}Det\text{-}Ratio\text{-}UE(i,\ j) = \frac{Avg\text{-}Thpt\text{-}UE(i,\ j)}{Avg\text{-}Total\text{-}Served\text{-}Thpt\text{-}Cell(j)}$$

where:

Avg-Thpt-UE(i,j) represents an average throughput for the $i^{th}$ carrier-aggregated UE in the $j^{th}$ cell across all data bearers associated with that UE; and Avg-Total-Served-Thpt-Cell(j) represents an average total throughput of the $j^{th}$ cell across all the UEs and defines a sum of radio resource allocation determination ratios of the $i^{th}$ carrier-aggregated UE across all its L cells in which it has an associated data bearer.

10. The computer readable memory according to claim 9, wherein Cell-Alloc-Det-Ratio-UE(i,j) for the $i^{th}$ carrier-aggregated UE in the $j^{th}$ cell accounts for:

the $i^{th}$ carrier-aggregated UE and its associated data bearers being served with a higher throughput in the $j^{th}$ cell over a period of time; and average loading of the $j^{th}$ cell over the same period of time.

* * * * *